M. AXILROD.
BEARING FOR CLUTCH AND PULLEY MECHANISM.
APPLICATION FILED MAY 18, 1918.

1,347,985. Patented July 27, 1920.

INVENTOR
Meyer Axilrod
By
Cyrus N. Anderson
ATTORNEY

UNITED STATES PATENT OFFICE.

MEYER AXILROD, OF NEW YORK, N. Y., ASSIGNOR TO SAFETY MACHINERY CORPORATION, OF NEW YORK, N. Y., A CORPORATION OF NEW YORK.

BEARING FOR CLUTCH AND PULLEY MECHANISM.

1,347,985.      Specification of Letters Patent.    Patented July 27, 1920.

Application filed May 18, 1918. Serial No. 235,268.

*To all whom it may concern:*

Be it known that I, MEYER AXILROD, a citizen of the United States, residing in the city and county of New York, State of New York, have invented certain new and useful Improvements in Bearings for Clutch and Pulley Mechanism, of which the following is a specification.

My invention relates broadly to clutch and brake mechanism of the character illustrated in Letters Patent of the United States, No. 1,188,385, issued to me June 27, 1916.

In the said patent, the hub of the driving pulley is provided with an opening through which the driving shaft extends, the said hub and shaft being in direct contact with each other. Upon the application of the brake to hold the said pulley against rotation, it will be apparent that the force applied by the said brake to the said pulley increases the pressure of the inner surface of the hub against the said shaft, so that the friction between the said hub and the shaft is increased. It will also be noted that the hub is of considerable length, which tends to cause an additional amount of friction. While the construction shown in this patent possesses many advantages as is pointed out therein, yet it has been found desirable to provide means to decrease the friction between the pulley and the shaft when the former is held against rotation while the shaft continues to rotate.

The object of my present invention, therefore, is to provide improved connection between the driving pulley and the driving shaft upon which it is mounted.

A further and more specific object is to provide means to prevent friction between the pulley and the shaft when the former is held against rotation while the latter continues to rotate.

A further object of my invention is to provide means to decrease the friction between the clutch applying lever and the clutch when the latter is forced against the driving pulley to cause rotation of it with the shaft and with the said clutch.

Other objects and advantages of my invention will be pointed out in the detailed description thereof in the specification which follows, or will be apparent from such description. In order that my invention may be more readily understood and its practical commercial advantages fully appreciated and comprehended, reference should be had to the accompanying drawing in which I have illustrated one form of a convenient embodiment of my said invention.

Figure 1:
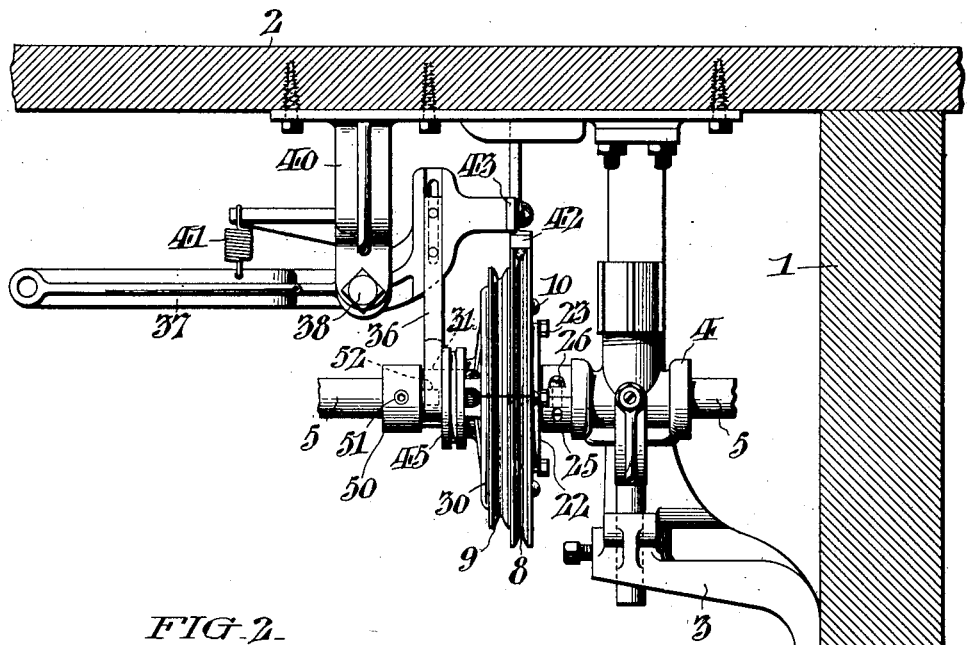
Figure 2:
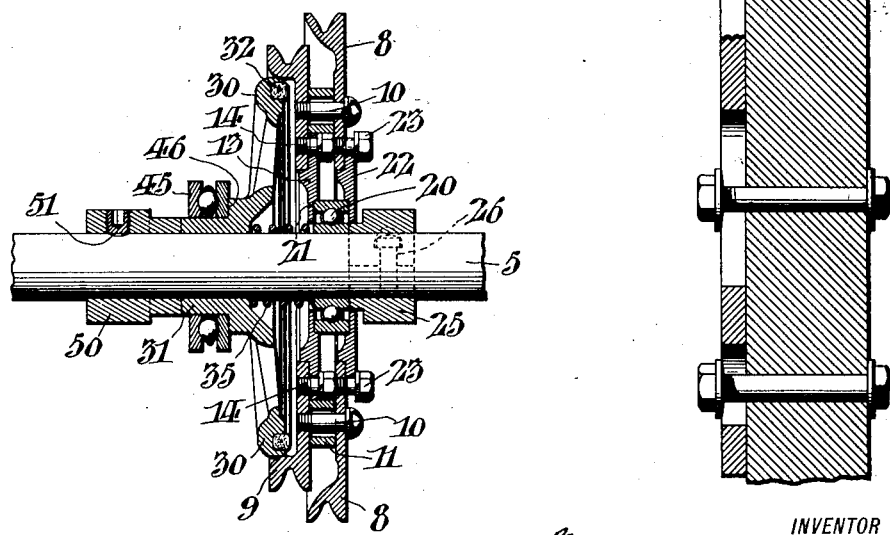

In the drawing, Figure 1 is a view showing, in side elevation, the mechanism comprising my invention, the portion of a table and a standard upon which the same is supported being shown in section; and Fig. 2 is a longitudinal vertical section of the mechanism comprising my invention.

Referring to the drawing: 1 designates one of the standards upon which a table 2 is supported, and 3 designates a bracket supporting a bearing 4, which constitutes one of the bearings in which the shaft 5 is rotatively supported.

For the purpose of transmitting power from the shaft 5 to a machine, such as a sewing machine (not shown), I have provided a pulley comprising the peripherally grooved annular plates 8 and 9. The grooves of these plates constitute the pulley grooves in which the driving rope or cord operates. These plates 8 and 9, respectively, may consist of single integral plates or else they may be divided into two parts secured together in any suitable manner. The plates 8 and 9 are secured together by means of screw bolts 10, said plates being spaced from each other by the spacing collars 11. 13 designates an annular plate which is secured to the inner edge of the annular plate 9, by means of screw bolts 14. The plate 13 may consist of a single annular member, or it may be divided into separate parts as desired.

Adjacent to the inner edge of the annular plate 13, I have provided a ball-bearing 20. The inner ring of the ball-bearing is secured to the shaft 5 and rotates therewith. One edge of the outer ring of the said ball-bearing is seated against an annular shoulder 21, formed in the inner edge of the annular plate 13. 22 designates a plate secured by means of screw bolts 23 to the inner edge of the plate 8. The said plate 22 may consist of a single integral member or of a plurality of members as desired. The inner edge portion of the plate 22 extends over one edge of the outer ring of the ball-bearing, so as to hold the same in place.

The balls of the ball-bearing are situated and held in known manner intermediate the inner and outer flat rings, as is clearly indicated in Fig. 2 of the drawing.

25 designates a collar, consisting of two members secured together by means of screws 26, the inner edge of said collar contacting with one edge of the inner ring of the ball-bearing 20, so as to prevent accidental movement of the ball-bearing and the pulley mounted thereon longitudinally of the shaft 5 when pressure is exerted thereagainst by the clutch member 30. The said clutch comprises a hub 31, which is slidably mounted upon the shaft 5; said clutch and hub may consist of a single integral member or it may be divided into a plurality of parts screwed together if desired. I have provided the inner portion of the said clutch adjacent to its outer peripheral edge with a bearing clutch pad 32, which is adapted to engage with the adjacent opposing surface of the annular plate 9. It will be understood that the form of the engaging surfaces of the clutch device may be varied as desired. For instance, a cone clutch may be substituted for the form of clutch shown.

Interposed between the hub 31 of the clutch member 30 and the inner ring of the ball-bearing 20, I have provided a spring 35, which tends to expand and cause disengagement of the clutch member 30 from the adjacent opposing surface of the pulley plate 9. The clutch is adapted to be forced into engagement with the pulley plate 9 by means of an arm 36, adjustably supported upon the lever 37, pivoted at 38 intermediate its ends to a bracket 40, depending from the supporting table 2. The spring 41 normally holds the lever 37 in position to permit disengagement of the clutch member 30 from the pulley plate 9 and to simultaneously apply the brake 42 to the pulley plate 8. The brake 42 is adjustably secured at 43 to one end of the lever 37.

The lower end of the adjustable arm 36 is bifurcated or forked and the sides of the bifurcations engage the outer ring of a ball-bearing 45, slidably supported upon a reduced outer end portion of the hub 31 of the clutch member 30. The inner ring of the said ball-bearing rests against a shoulder 46 upon the said hub. When it is desired to engage the clutch member 30 with the pulley, the outer end of the lever 37 is depressed in opposition to the tension of the spring 41. The movement of said lever thereby occasioned causes movement of the arm 36 toward the right to force the clutch member 30 into engagement with the pulley. The presence of the ball-bearing avoids relative movement between the arm 36 and the part with which it contacts to force the clutch into engagement with the said pulley. In other words, the friction between the outer plate of the ball-bearing 45 and the lower end of the arm 36 prevents rotation of the said plate. The inner plate of the said ball-bearing which is seated against the shoulder 46 rotates with the clutch member 30.

In order to retain the clutch member 30 in proper relation to the pulley, I have provided the collar 50, which is adapted to be held in fixed position upon the shaft 5 by means of a binding screw 51 and is provided with projections 52, which engage corresponding notches in the hub 31 of the clutch member 30. By this construction, said clutch is rotatively fixed upon shaft 5, but has the capacity of longitudinal shifting as above noted.

I claim:

1. In combination, a pulley comprising a plurality of annular plates arranged in parallel relation to each other, each of the said plates being provided with a peripheral groove, means for securing the said plates together in spaced relation to each other, a shaft, a ball-bearing secured to said shaft and annular plate members intermediate the said ball-bearing and the said annular plates, said members being secured to said annular plates and connecting the latter with said ball bearing.

2. In combination, a pulley comprising a plurality of annular plates each having a peripheral groove, spacing rings interposed between said plates, means for securing said plates together, a shaft, ball-bearings secured to said shaft and annular plate members for securing the inner edges of said annular plates to said ball-bearings.

In testimony that I claim the foregoing as my invention, I have hereunto signed my name this 13th day of May, A. D., 1918.

MEYER AXILROD.